United States Patent Office 3,655,785
Patented Apr. 11, 1972

---

3,655,785
METHOD OF MAKING PERFLUOROSTYRENE
Leo A. Wall, McLean, Va., and Joseph M. Antonucci, Hyattsville, Md., assignors to the United States of America as represented by the Secretary of the Navy
No Drawing. Original application Aug. 12, 1963, Ser. No. 301,681, now Patent No. 3,513,206. Divided and this application Nov. 6, 1969, Ser. No. 874,671
Int. Cl. C07c 25/04
U.S. Cl. 260—651 F                  2 Claims

ABSTRACT OF THE DISCLOSURE

A method of making perfluorostyrene in which (2-chloro 1,2,1-trifluoroethyl)perfluorobenzene is brought into contact with molten potassium hydroxide which may be on carbon pellets.

STATEMENT OF GOVERNMENT INTEREST

The invention described herein may be manufactured and used by or for the Government of the United States of America for governmental purposes without the payment of any royalties thereon or therefor.

This invention relates to synthesis of octafluorostyrene (perfluorostyrene) through the chemical dehydrochlorination of (2-chloro-1,2,2-trifluoroethyl)perfluorobenzene.

This application is a division of our copending application Ser. No. 301,681, filed Aug. 12, 1963, now Pat. No. 3,513,206 and is related to our copending application Ser. No. 167,195, filed Jan. 18, 1962, now Pat. 3,265,746, granted Aug. 9, 1966.

PRIOR ART

The possibility of obtaining a thermal-resistant, radiation-resistant material which is a polymer of perfluorostyrene has stimulated the invention of the method herein described for the preparation of the monomer.

An object, therefore, of the present invention is the preparation of perfluorostyrene.

The invention will become better understood by reference to the following description.

Perfluorostyrene has been synthesized according to methods described in the aforementioned related application and in the publication (3) of Letchford and co-workers. According to the present invention, a new method is presented for the preparation of perfluorostyrene. A synthesis scheme employed for the synthesis of this monomer is shown in Table 1.

TABLE 1.—Monomer synthesis

Method A

1) $C_6F_5MgBr \xrightarrow[2) H_2O, H^+]{1) CF_3CHO} C_6F_5\overset{OH}{\underset{|}{C}}HCF_3$
(I)
53%

2) $C_6F_5\overset{OH}{\underset{|}{C}}HCF_3 \xrightarrow[n\text{-Pentane}]{SF_4} C_6F_5CHFCF_3$
(I)                                   (II)
                                      90%

3) $C_6F_5CHFCF_3 \xrightarrow[0.1 \text{ mm-760 mm}]{500° C-900° C} C_6F_5CF=CF_2 + C_6F_5CH=CF_2$
(II)                                    (III)            (IV)
                                        Minor           Major
                                        Product         Product

Alternate route to perfluorostyrene

Another route to perfluorostyrene and (2,2-difluorovinyl)perfluorobenzene is illustrated by Method B (Table 2). Addition of chlorodifluoroacetaldehyde, prepared by the reduction of the lithium salt of chlorodifluoroacetic acid with lithium aluminum hydride, to the pentafluorophenyl Grignard reagent resulted in a 78% yield of the previously unknown compound 2,3,4,5,6-pentafluoro-α-(chlorodifluoromethyl)benzyl alcohol (VI). Alcohol (VI) was similar in properties to alcohol (I) described in parent case U.S. Pat. No. 3,513,206 and was easily purified by sublimation under autogenous pressure using moderate heating. Conversion of (VI) to (2-chloro-1,2,2-trifluoroethyl)perfluorobenzene (VII) by means of sulfur tetrafluoride proceeded smoothly and in high yield (90%).

Third route to perfluorostyrene

Still another synthetic route (Method B') to perfluorostyrene involves the chemical dehydrochlorination of (2-chloro-1,2,2-trifluoroethyl)perfluorobenzene (VII). Compound (VII) was dropped into molten potassium hydroxide and rapidly distilled out in order to provide only a short contact time. A 46% conversion to perfluorostyrene was obtained. A small quantity of unidentified, volatile compounds was also produced, along with a small quantity of tarry material. The yield of perfluorostyrene was 71% based on unrecovered starting material. An alternative technique involves passage of (VII), under reduced pressure, through a heated iron tube packed with carbon pellets which have been impregnated with potassium hydroxide. The conversion was 40 to 60%, depending on the pressure employed, and the yields ranged from 70 to 80%.

TABLE 2.—Monomer synthesis

Method B

1) $ClF_2CCOOH \xrightarrow[2) LiAlH_4]{1) LiH} ClF_2CCH(OH)_2 \xrightarrow[P_2O_5]{H_2SO_4} ClF_2CCHO$ 2) $C_6F_5MgBr \xrightarrow[2) H_2O, H^+]{1) ClF_2CCHO} C_6F_5\overset{OH}{\underset{|}{C}}HCClF_2$
                                                            (VI)
                                                            78%

3) $C_6F_5\overset{OH}{\underset{|}{C}}HCClF_2 \xrightarrow[n\text{-Pentane}]{SF_4} C_6F_5CHFCClF_2$
(VI)                                        (VII)
                                            90%

4) $C_6F_5CHFCClF_2 \xrightarrow[0.1 \text{mm.-760 mm.}]{450° C.-650° C.} C_6F_5CF=CF_2 + C_6F_5CH=CF_2$
                                                (III)            (IV)
                                                Minor            Major
                                                Product          Product Method B'

1) $C_6F_5CHFCClF_2 \xrightarrow[\text{KOH on carbon pellets}]{\text{Molten KOH or}} C_6F_5CF=CF_2$
(VII)                                                   (III)
                                                        40-60% Conversion
                                                        70-80% Yield

EXPERIMENTAL

Method B (1) Synthesis of chloridifluoroacetaldehyde.—In a one-liter three-necked flask equipped with a motor-driven, Teflon-blade stirrer, an efficient water-cooled condenser carrying a drying tube, and a pressure-equalized dropping funnel fitted with a nitrogen inlet tube, was placed 39 g. (0.3 mole) of chlorodifluoroacetic acid (Columbia Organic Chemicals, Inc.) in 250 ml. of anhydrous ether. The apparatus was continuously flushed with nitrogen during the course of the reaction. After the flask had been cooled to about −60° C., a suspension of 2.4 g. (0.3 mole) of lithium hydride in 150 ml. of anhydrous ether was cautiously added with stirring, over a period of 30 minutes. The temperature of the ethereal mixture was raised to −10° C., and a solution of 3.8 g. (0.1 mole) of lithium aluminum hydride in 200 ml. of anhydrous ether was slowly added over a period of 30 minutes. Throughout the addition, the temperature was maintained between −10° C. and 0° C. After the addition was completed, the stirring was continued for one hour at −5° C. The reaction mixture was allowed to warm to room temperature overnight.

The flask was cooled to −10° C., and 20 ml. of water followed by 100 ml. of 15% sulfuric acid was carefully added with stirring. The ether layer was separated and the aqueous layer was extracted several times with small portions of ether. The ether layer and the other extracts were combined and dried overnight over anhydrous sodium sulfate. The ether was removed by distillation. A small amount of liquid boiling between 35 and 90° C. was also collected. The latter fraction presumably is crude 2-chloro-2,2-difluoroethanol. The residual liquid (about 36 g.) represented the crude aldehyde hydrate. The crude yield of hydrate was about 90%. The crude aldehyde hydrate was converted to the free aldehyde by the method used to prepare trifluoroacetaldehyde (9). The over-all yield was 84% (29 g.).

(2) Synthesis of 2,3,4,5,6-pentafluoro-α-(chlorodifluoromethyl)benzyl alcohol (VI).—This alcohol was prepared by the same method used to prepare alcohol (I). From 24.7 g. of bromopentafluorobenzene and excess (29 g.) chlorodifluoroacetaldehyde there was obtained, via the Grignard reaction, 22 g. of a white crystalline solid, M.P. 53–55° C. The yield of the purified alcohol (VI) was 78%, based on the bromopentafluorobenzene consumed. The structure assigned to the alcohol was confirmed by infrared spectral analysis (hydroxyl band at about 3500 cm.$^{-1}$ and $C_6F_5$-doublet at 1500–1520 cm.$^{-1}$) and by mass spectrometry.

(3) Synthesis of (2-trifluoroethyl)perfluorobenzene (VII).—The same procedure used to prepare compound (II) described in patent case U.S. Pat. No. 3,513,206 was employed to prepare compound (VII). From 20 g. (0.071 mole) of the alcohol in 70 ml. of n-pentane and 22 g. of sulfur tetrafluoride, heated in a bomb at 50–90° C. for 18 hours, was obtained 18.5 g. of a clear colorless liquid, B.P. 155–7° C. Vapor-phase chromatography revealed that the liquid was essentially one component (>98%). The infrared spectrum resembled that of (II); mass spectrometry showed the appropriate peaks for the assigned structure.

(4) Pyrolysis of (2-chloro-1,2,2-trifluoroethyl)perfluorobenzene (VII).—The pyrolysis apparatus was the same as that used in the case of compound (II). The results of several pyrolyses in an unpacked iron tube were similar to those obtained in the pyrolysis of (II), except that the conversion to products was considerably higher. The major product was (IV) and the minor product proved to be perfluorostyrene (III). Under mild conditions (400–500° C. and 0.1 mm.), only (IV) was formed. Under more severe conditions (higher temperatures and/or longer contact times), perfluorostyrene was produced, along with (IV), although the latter was still the major product.

However, when the pyrolysis of (VII) was conducted at 600° C. and atmospheric pressure under nitrogen in a Pyrex glass tube packed with Pyrex helices, perfluorostyrene (III) was the major product and (IV) was the minor product. The conversion to perfluorostyrene was 40–45%. Only a 10–15% conversion to (IV) was obtained. A small, low-boiling, unidentified component (5%) was also present. The material recovery was quite good (90–95%).

The components of the various pyrolyzates obtained from compound (VII) were isolated by preparative vapor-phase chromatography using an 8-ft. by ⅝-in. column filled with a packing of 25% silicone oil (SE-30) on 40/60 mesh acid-washed Chromosorb W. Separation of the components was facilitated in this case because of (a) the longer retention time of (VII) as compared to that of (II) and (b) the higher conversion to products.

The identity of the products was confirmed by infrared spectroscopy, mass spectroscopy, and vapor-phase chromatography.

Method B'

(1) Chemical dehydrochlorination of (2-chloro-1,2,2-trifluoroethyl)perfluorobenzene (VII).—In a 25-ml. sidearm flask (equipped with a short distillation head leading to a receiver cooled to −20° C.) was placed 5 g. of potassium hydroxide and 5 g. of anhydrous sodium carbonate. The side arm was covered with a silicone-rubber septum. The flask was heated under reduced pressure (20 mm.) in order to remove most of the water from the potassium hydroxide-sodium carbonate mixture. The vacuum was released, and a drying tube was attached to the distillation head. The heating was continued until the potassium hydroxide in the mixture just began to melt. At this point, 2 g. of compound (VII) was injected in several spurts by means of a hypodermic syringe inserted through the rubber septum. Along with a small amount of volatile material that flashed over, about 1.6 g. of an acrid-smelling liquid was collected. Vapor-phase chromatographic analysis revealed essentially three components in this material. One of the major components (40%) was unchanged starting material. The other (55%) had the same retention time as perfluorostyrene. The minor component (5%) had the same retention time as (IV). Preparative vapor-phase chromatography gave about 0.8 g. of perfluorostyrene and 0.7 g. of (VII). The yield of perfluorostyrene, based on unrecovered starting material, was 71% (conversion, 46%). A small amount of unidentified, tarry substance remained in the flask.

An alternative technique for dehydrochlorination employed an iron tube 24-in. by ⅝-in. packed with carbon pellets that had been impregnated with an equal weight of potassium hydroxide. The packing occupied about 10 inches of the heated zone. The tube was heated to 400° C. and compound (VII) was slowly distilled over under reduced pressure (0.1 to 1 mm.). Conversions were of the order of 40–60%, and yields of 70–80% of perfluorostyrene were obtained.

Literature references (1) Antonucci, J. M., Straus, S., Tryon, M., and Wall, L. A., "Degradation of Poly-2,3,4,5,6-pentafluorostyrene," Proc. Sym. Polymer Degradation, Soc. of Chem. Ind., Monograph No. 13, 295 (1961).

(2) Brown, D. W., Florin, R. E., and Wall, L. A., J. Research Natl. Bur. Standards, 64A, 269 (1960).

(3) Letchford, B. R., Patrick, C. R., Stacey, M., and Tatlow, J. C., Chem. Ind. (London), 32, 1472 (1962).

(4) Pummer, W. J., and Wall, L. A., J. Research Natl. Bur. Standards, 63A, 167 (1959).

(5) Nield, E., Stephens, R., and Tatlow, J. C., J. Chem. Soc., 166 (1959).

(6) Englehardt, V. A., Hasek, W. R., and Smith, W.C., J. Am. Chem. Soc., 82, 543 (1960).

(7) Coe, P. L., Patrick, C. R., and Tatlow, J. C., Tetrahedron, 9, 240 (1960).

(8) Brice, T. J., Pearlson, W. H., and Simons, J. H., U.S. Pat. 2,658,928 (1953).

(9) Braid, M., Iserson, H., and Lawlor, F. E., J. Am. Chem. Soc., 76, 4027 (1954).

(10) Nield, E., Stephens, R., and Tatlow, J. C., J. Chem. Soc., 3800 (1960).

Since modifications and variations in the practice of the method invention are possible in the light of the above teachings without departing from the spirit or scope of the invention, it is intended that the invention shall not be limited except as is required by the appended claims.

What is claimed and desired to be secured by Letters Patent of the United States is:

1. A method of making perfluorostyrene which comprises bringing (2-chloro-1,2,2-trifluoroethyl) perfluorobenzene into contact with potassium hydroxide at 360° to about 400° C.

2. A method as defined in claim 1, wherein the potassium hydroxide is on carbon pellets.

References Cited

UNITED STATES PATENTS

| 2,651,627 | 9/1953 | Prober | 260—651 F |
|---|---|---|---|
| 3,265,746 | 8/1966 | Wall et al. | 260—651 F |
| 3,513,206 | 5/1970 | Wall et al. | 260—618 D |

OTHER REFERENCES

Antonucci et al., Chem. Abstracts, 59, 9844h–9845a (1963).

DANIEL D. HORWITZ, Primary Examiner

U.S. Cl. X.R.

260—91.5